United States Patent [19]

Hansen et al.

[11] Patent Number: 5,681,222

[45] Date of Patent: Oct. 28, 1997

[54] TORQUE OVERLOAD CLUTCH COUPLER FOR A TORQUE TRANSMITTING DRIVELINE

[75] Inventors: George N. P. Hansen, Milwaukee; Mark A. Fechter, West Bend; Roger D. Mayhew, Fredonia, all of Wis.

[73] Assignee: Weasler Engineering, Inc., West Bend, Wis.

[21] Appl. No.: 395,341

[22] Filed: Feb. 28, 1995

[51] Int. Cl.$^6$ ..................................................... F16D 1/12
[52] U.S. Cl. .................. 464/160; 464/17; 464/46
[58] Field of Search ........................... 464/40, 45, 46, 464/48, 17, 30, 160; 192/70.16, 70.19, 113.4, 113.23, 56.6, 89.2

[56] References Cited

U.S. PATENT DOCUMENTS

| | | | |
|---|---|---|---|
| 2,618,136 | 11/1952 | Wellauer | 464/48 |
| 2,622,417 | 12/1952 | Brown et al. | 464/17 |
| 2,729,077 | 1/1956 | Holloway | 464/46 |
| 3,100,974 | 8/1963 | Wilson et al. | 464/46 |
| 4,055,967 | 11/1977 | Terranova et al. | |
| 4,086,012 | 4/1978 | Buckley et al. | 403/2 |
| 4,373,358 | 2/1983 | Pearch et al. | 464/48 |
| 4,445,876 | 5/1984 | Entrup | 464/48 |
| 4,501,570 | 2/1985 | Konrad | 464/48 |
| 4,548,302 | 10/1985 | Lech, Jr. et al. | |
| 4,617,003 | 10/1986 | Bobber et al. | 464/48 |
| 4,758,109 | 7/1988 | Little et al. | 403/2 |
| 5,010,992 | 4/1991 | Maurer | 192/89.2 X |
| 5,271,487 | 12/1993 | Bruno | |

FOREIGN PATENT DOCUMENTS

| | | | |
|---|---|---|---|
| 48516 | 3/1982 | European Pat. Off. | 464/40 |
| 62-35119 | 2/1987 | Japan | 464/40 |
| 1128010 | 12/1984 | U.S.S.R. | 464/40 |
| 431026 | 6/1935 | United Kingdom | 464/48 |
| 2088527 | 6/1982 | United Kingdom | 464/30 |
| 2233735 | 1/1991 | United Kingdom | 464/46 |

OTHER PUBLICATIONS

Page from borchure entitled New Holland Round Balers 630,650, 660 of Ford New Holland, Inc. Ford New Holland Inc., Jan. 1991.

*Primary Examiner*—Daniel P. Stodola
*Assistant Examiner*—Eileen A. Dunn
*Attorney, Agent, or Firm*—Quarles & Brady

[57] ABSTRACT

A torque overload coupler for a driveline allows limited free motion. In one embodiment, torque overload protection is provided by a friction slip clutch and tangs formed at the inner perimeter of a clutch plate fit into spaces between lugs defined on a hub to provide a limited range of free motion. In another embodiment, torque overload is provided by a shear pin and free motion is provided by the shear pin fitting into angular spaces between wings of a relatively rotatable hub.

7 Claims, 3 Drawing Sheets

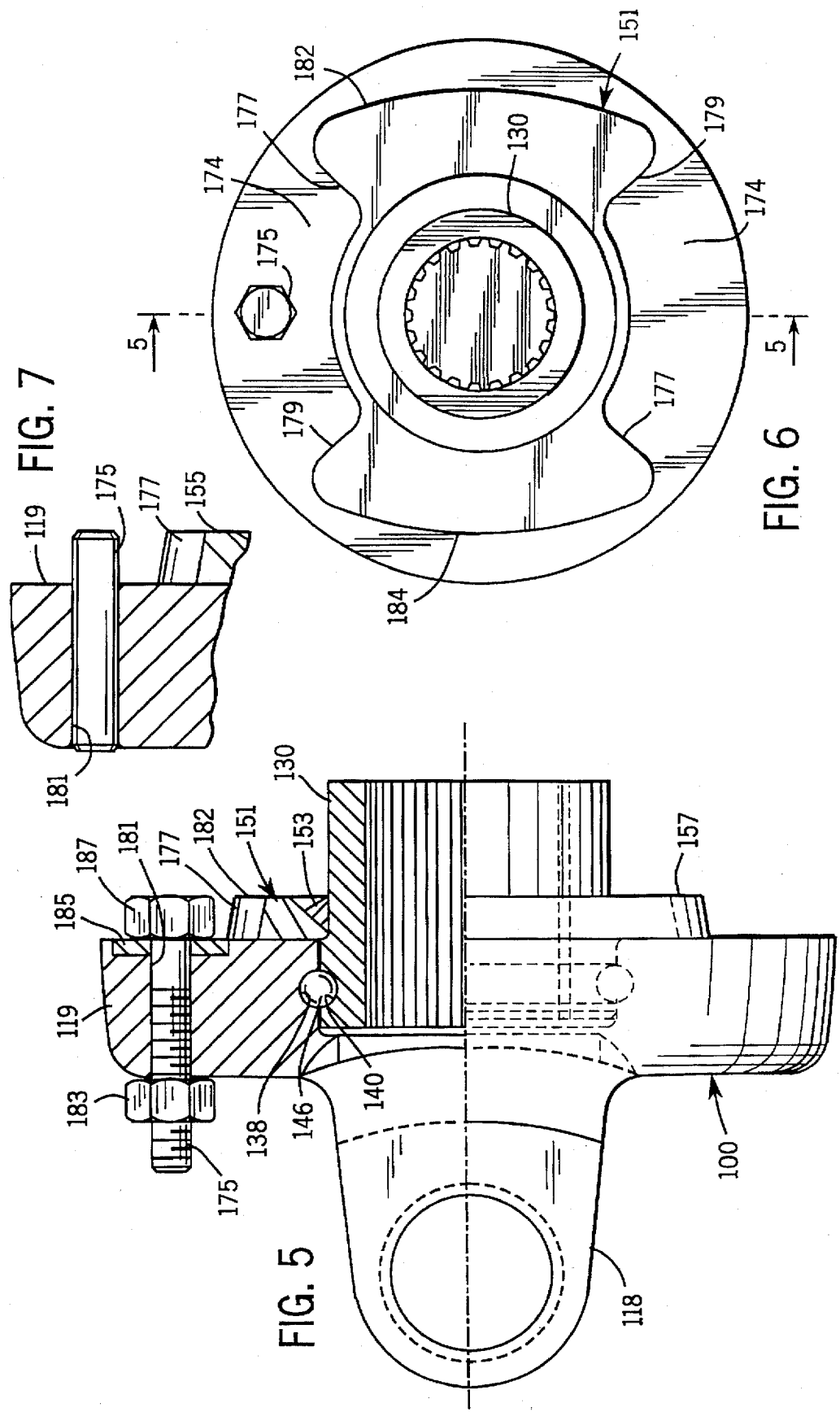

5,681,222

TORQUE OVERLOAD CLUTCH COUPLER FOR A TORQUE TRANSMITTING DRIVELINE

BACKGROUND OF THE INVENTION

1. Field of the Invention

This invention relates to torque transmitting couplings for drive-lines and in particular to a torque transmitting coupling which provides torque overload protection and a limited range of free motion.

2. Discussion of the Prior Art

In connecting a driveline between a driven shaft and a driving shaft, both of the shafts may be difficult to turn so that aligning them to make the connection is very difficult. For example, in connecting the universal joint of an agricultural implement to the power take-off shaft of a tractor, there is a problem in aligning the splines of the implement shaft with the splines of the tractor's power take-off shaft. To overcome this problem, it is known to provide a free motion device which allows limited rotation between the two ends of the device so that the splines can be aligned.

It is also desirable in some applications, to limit the torque which can be transmitted by the driveline. Several methods of doing this are known, including friction clutches which slip when the torque becomes too great, and also shear devices are known in which a shear pin is sheared off when the torque exceeds a certain level.

Heretofore, the capability of a limited degree of free motion and torque overload protection have been provided in separate devices. The present invention addresses this issue.

SUMMARY OF THE INVENTION

The invention provides a torque overload coupler for a torque transmitting driveline which efficiently and economically provides limited free motion and torque overload protection in a single, self-contained unit. In one aspect, first means for connecting the coupler to a torque input shaft and second means for connecting the coupler to a torque output shaft have a bearing between them for allowing relative rotation and fixing them axially. A clutch housing is fixed to the first connecting means and a clutch plate in the clutch housing which engages the housing has tangs defined at an inner perimeter with interstitial angular spaces between the tangs. Lugs are defined on the second connecting means which extend radially into the interstitial angular spaces and are smaller in angular extent than the interstitial spaces. The first means can therefore rotate relative to the second means through an angle which is limited by the lugs abutting the tangs to allow alignment when the coupler is being connected between two shafts, and the clutch plate slipping relative to the clutch housing provides torque overload protection. In this aspect, a pressure plate is preferably provided in the clutch housing which is biased against the clutch plate so that the clutch is normally engaged.

In another aspect, the invention provides a torque overload coupler for a torque transmitting drive-line with limited free motion and shear joint torque overload protection. In this aspect, a radially extending flange is formed on the first connecting means in axially facing contact with a surface of the second connecting means, and the flange defines axially symmetrical wings having angular spaces between them. A shear pin is received in a hole in the surface of the second means and extends from the surface into one of the angular spaces for side-to-side abutment with sides of the wings, the shear pin being shearable by one of the wings if a certain torque limit is exceeded.

Other objects and advantages of the invention will be apparent from the drawings and the detailed description.

BRIEF DESCRIPTION OF THE DRAWINGS

FIG. 5 is a sectional view of a second embodiment of a torque overload free motion shear device of the invention;

FIG. 6 is an end view of the device of FIG. 5; and

FIG. 7 is a fragmentary view of an alternate embodiment.

DETAILED DESCRIPTION OF THE PREFERRED EMBODIMENTS

Figure 1:
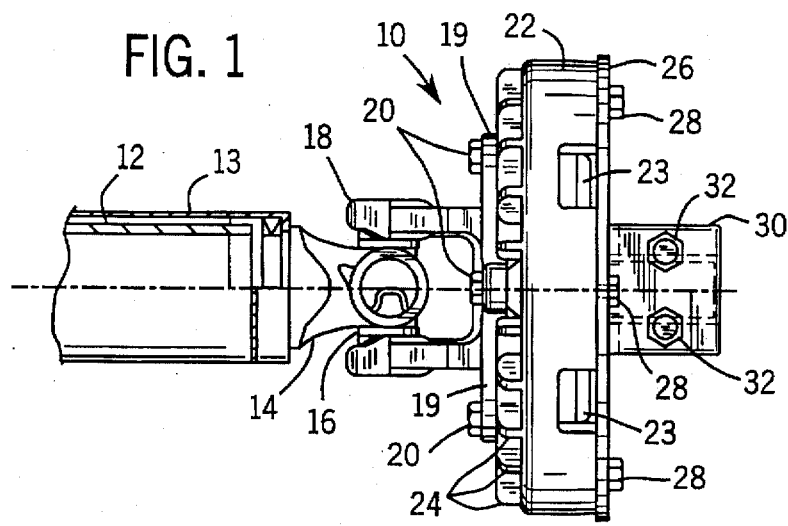
FIG. 1 is a plan view of a free motion device of the invention shown attached to a driveline.

FIG. 1 illustrates a device 10 of the invention shown coupled to a driveline 12. The driveline 12 may be any type of driveline, for example an industrial or an agricultural driveline, and may be provided with a shield or guard 13.

At one end of the driveline, a universal joint yoke 14 is secured to the driveline and is rotatably secured to two arms of a universal joint cross 16, whose other two arms are rotatably secured to yoke 18, which is part of the device 10. Yoke 18 has legs 19 (three of four are shown) which are fixed by bolts 20 to a clutch housing 22 which has cooling fins 24 on its front side and is covered on its back side by cover plate 26, which is secured to the housing 22 by bolts 28.

Figure 2:
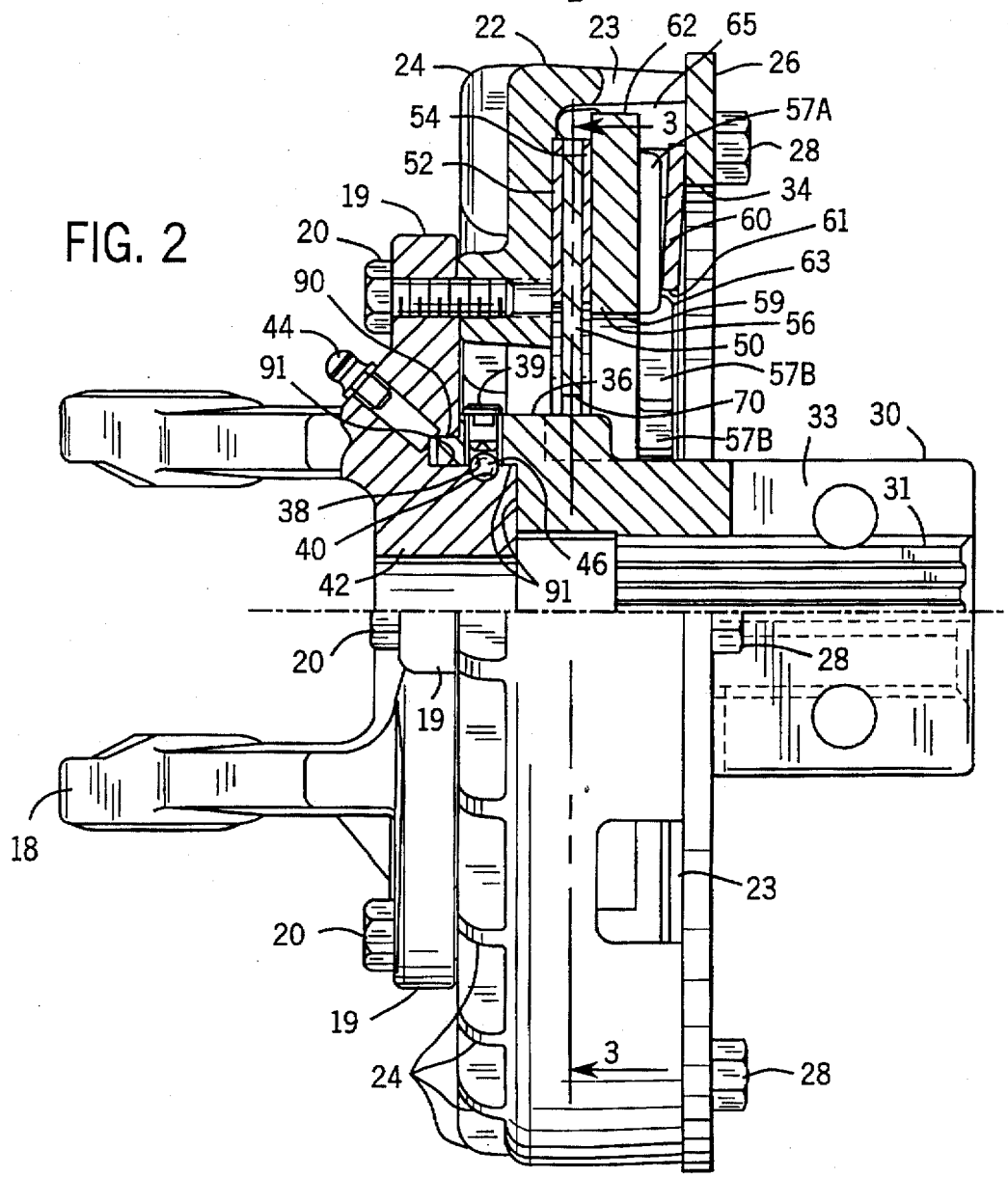
FIG. 2 is a partial sectional view of the device shown in FIG. 1, as viewed from the plane of the line 2—2 of FIG. 4.

Hub 30 is preferably internally splined as shown at 31 to mate with the splines on a shaft to be connected to the hub 30 and may be slotted as shown at 33 and provided with bolts 32 for clamping it to the shaft to fix it axially, for example for clamping it to the implement gearbox or input shaft or power take-off shaft of a tractor. A keyed connection or any other suitable rotary drive connection may alternatively be used. Hub 30 extends through hole 34 (FIG. 2) of plate 26 and, at the inner end of hub 30, an axially extending flange 36 is formed and defines an outer ball bearing race 38 on its inner diameter. A set screw 39 is screwed radially into flange 36 and opens into the race 38 so that balls 46 can be loaded into the race. It should be noted that the gap at 90 (for example, 0.0025 inches) is preferably substantially smaller than the gaps at 91 (for example, 0.012 inches) to inhibit lubricant flow past it. The axial length of the gap 90 (for example, 0.25 inches) and its smallness work as an effective seal, so that no additional seal, such as an O-ring, is necessary.

An inner bearing race 40 is formed in flange 42 of yoke 18, and grease fitting 44 in yoke 18 allows for lubrication of the balls 46 in the raceways 38 and 40. Accordingly, the anti-friction bearing provided by the balls 46 in the raceways 38 and 40 allows for relative rotation between the yoke 18 and the hub 30, while fixing the yoke 18 and the hub 30 together axially.

Radially outward of flange 36, a clutch plate 50 is received in a slight recess on the inside axial face of the housing 22, which locates the plate 50 radially. The clutch plate 50 surrounds hub 30 and is provided with facings 52 and 54 of friction material on its two axial faces, between housing 22 and pressure plate 56. Pressure plate 56 is biased toward clutch plate 50 by belleville spring 60 so as to compress the plate 50 and facings 52 and 54 between the pressure plate 56 and the housing 22. Coil springs or other biasing means may also be used to bias the plate 56.

Pressure plate 56 preferably has raised radially extending angularly spaced ribs 57A and 57B (FIGS. 2 and 4) on its outer surface which press against the spring 60 adjacent to the inside diameter of the spring 60 so as to minimize the surface area of contact between the pressure plate 56 and the spring 60, thereby minimizing heat transfer from the plate 56 to the spring 60. This minimizes damage to the spring 60 from heat. Ribs 57A stop at the inside diameter 59 of the plate 56 and ribs 57B rise axially slightly at the inside diameter 59 to create shoulders 63 which locate the spring 60 on its inside diameter 61. Ribs 57B extend inward of the inside diameter 59 to create a centrifugal fan for cooling of the unit. Also, open spaces 21 (two of four shown in FIG. 4) are defined between the legs 19 and the housing 22 through which air may be drawn by the fan to cool the unit. Openings 23 are also preferably provided in the side of the clutch housing 22 for cooling air flow.

On its outer perimeter, pressure plate 56 has ears 62 (FIG. 4) which extend into spaces 65 defined between tongues 64 formed on the inside of the housing 22 so as to hold the housing 22 and pressure plate 56 nonrotatable relative to one another, but allow them to move axially relative to one another. The fit of the ears 62 in the spaces 65 need not be tight, so as to allow for liberal manufacturing tolerances, since once the ears 62 contact the tongues 64, they stay in that position, being substantially held against relative rotation by the frictional engagement of the clutch plate 50.

Figure 3:
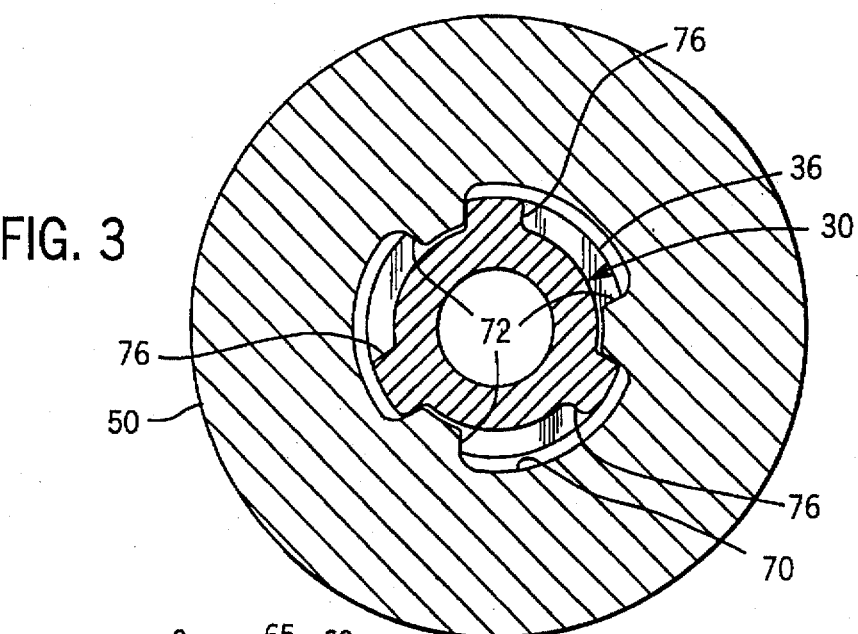
FIG. 3 is a cross-sectional view of a clutch plate and hub for the invention as viewed from the plane of the line 3—3 of FIG. 2 and shown in an engaged position.
Figure 4:
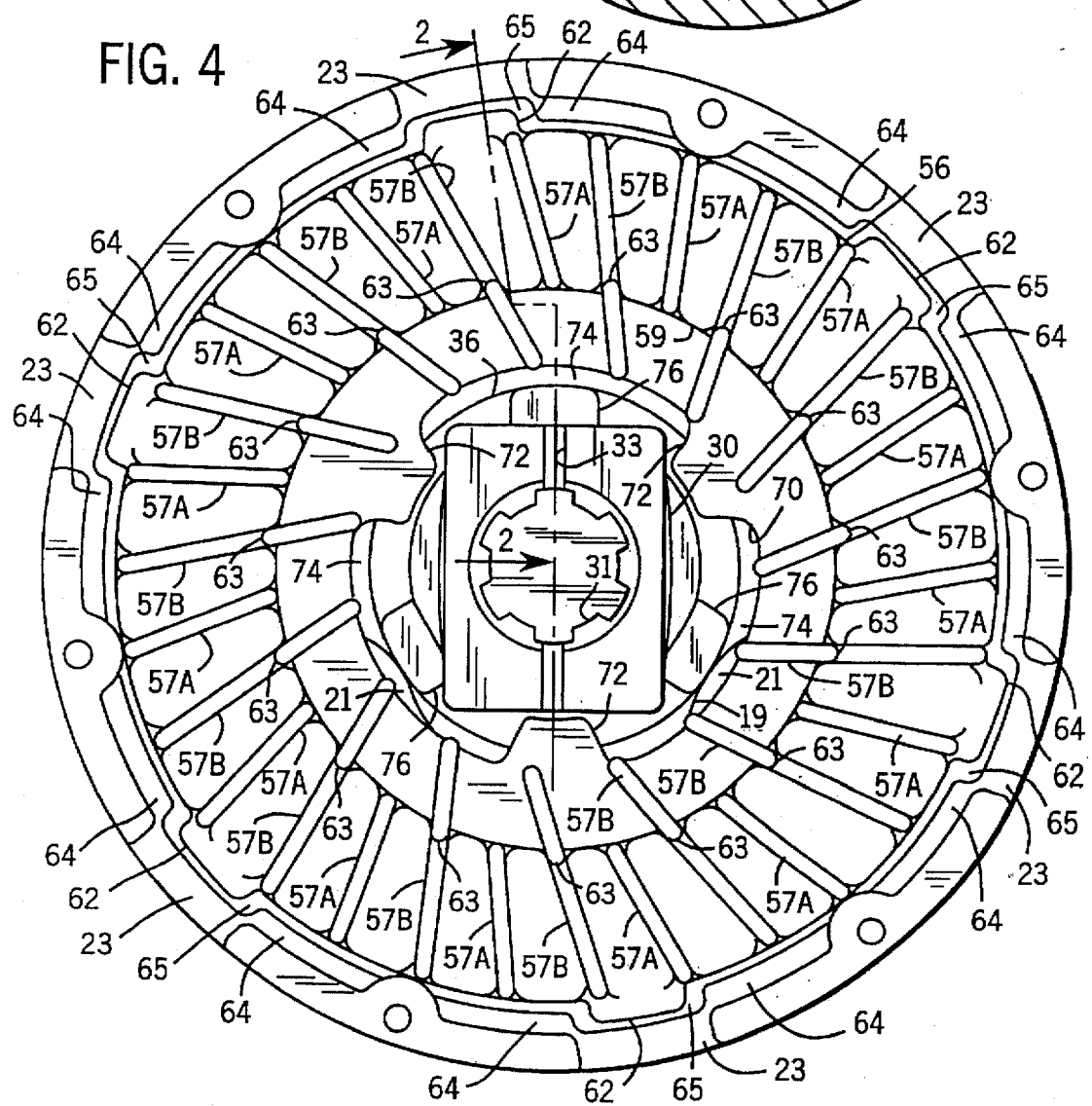
FIG. 4 is a right end elevational view of the coupling shown without the cover plate or belleville spring and with the hub and clutch plate shown in a disengaged position.

The inside periphery 70 of the clutch plate 50 defines 3 equiangularly spaced tangs 72 (FIG. 3) with angular spaces 74 defined between the tangs 72. Three equiangularly spaced lugs 76 are formed on the flange 36 of hub 30 which extend into the spaces 74 and are of an angular size smaller than the spaces 74 so that the hub 30 may be turned by approximately 60 degrees relative to yoke 18 (30° in either direction from being centered, as shown in FIG. 4) before the lugs 76 contact the tangs 72. This degree of angular freedom is sufficient in most cases to allow aligning the splines of the hub 30 with the splines of the shaft to which the hub 30 is to be connected, or, if the opposite end of the drive-line is the last one to be connected, the alignment can be made at that end as well. More or less than three tangs and nestled lugs may be used to practice the invention.

Under operation, when the device 10 is being used to transmit torque in the operation of the driveline, the torque is transmitted by the lugs 76 abutting the tangs 72 and is transmitted up to the torque value at which slippage occurs between the clutch plate 50 and the housing 22 and pressure plate 56.

FIG. 5 illustrates a second embodiment of a device 100 of the invention. The device 100 has a yoke 118 which has a radially extending circular flange 119. An outer bearing race 138 is formed in the inside diameter of the flange 119 and an inner bearing race 140 is formed in the outside diameter of hub 130. Thus, the bearing provided by balls 146 and races 138 and 140 allows angular rotation between the hub 130 and yoke 118 while fixing them axially relative to one another. A grease fitting (not shown) for lubricating the bearing could be provided in the flange 119, and any suitable means, for example similar to the set screw provided in the first embodiment, could be provided, for example through flange 119, to load the balls 146 into the raceways 138 and 140.

A flange 151 is securely affixed to the hub 130 by weld 153, or other suitable means, for example by being cast or formed integrally with the hub 130. The flange 151 is axially symmetrical and defines two symmetrical wings 182 and 184. The wings 182 and 184 define between them angular spaces 174. A shear pin 175 extends into one (or both, although not shown) of the angular spaces 174 and is positioned so as to abut one of the surfaces 177 or 179, both of which are aligned along radial lines, should the hub 130 be turned relative to the yoke 118 by approximately 60 degrees (30° in either direction from center).

As shown in FIGS. 5 and 6, the shear pin 175 is a bolt which is secured to the flange 119 by being inserted through a hole 181 in the flange 119 and having a nut 183 securing it on the back side of the flange 119. A recessed washer 185 may be provided at the head end of the bolt 175 so that when the head 187 gets sheared off due to a torque overload condition, the metal of the flange 119 adjacent to the head 187 is not damaged. In addition, the flange 119 may be heat treated to avoid damage to it. However, as shown in FIG. 7, the shear pin 175 could be a pin pressed into a bore in the flange 119, with or without (as shown in FIG. 7) a surrounding washer.

Many modifications and variations to the preferred embodiments described will be apparent to those skilled in the art. Therefore, the invention should not be limited to the embodiments described, but should be defined by the claims which follow:

We claim:

1. A torque overload clutch coupler for a torque transmitting driveline, comprising;

first means for connecting said coupler to a torque input shaft;

second means for connecting said coupler to a torque output shaft;

a bearing between said first and second connecting means for allowing free relative rotation between said first and second connecting means and fixing said connecting means axially relative to one another;

a clutch housing fixed to said first connecting means; a clutch plate in said clutch housing for frictionally engaging said clutch housing, said clutch plate having tangs defined at an inner perimeter thereof and interstitial angular spaces between said tangs;

lugs defined on said second connecting means extending within said interstitial angular spaces and being smaller in angular extent than said interstitial spaces so as to allow a predetermined amount of relative rotation between said first and second connecting means;

wherein said first connecting means can freely rotate without substantial torque resistance relative to said second connecting means through an angle which is limited by said lugs abutting said tangs.

2. A torque overload clutch coupler as claimed in claim 1, wherein said angle is approximately 60 degrees.

3. A torque overload clutch coupler as claimed in claim 2, wherein three of said tangs and three of said lugs are provided.

4. A torque overload clutch coupler is claimed in claim 1, further comprising a pressure plate in said clutch housing and means biasing said pressure plate against said clutch plate so that said clutch coupler is normally engaged.

5. A torque overload clutch coupler as claimed in claim 4, further comprising fins on said pressure plate in contact with said biasing means, said fins thermally isolating said biasing means from said pressure plate.

6. A torque overload clutch coupler as claimed in claim 1, wherein one of said connecting means is a universal joint yoke.

7. A torque overload clutch coupler as claimed in claim 6, wherein the other one of said connecting means is an internally splined collar.

* * * * *